(12) United States Patent
Lepak et al.

(10) Patent No.: US 9,418,019 B2
(45) Date of Patent: Aug. 16, 2016

(54) CACHE REPLACEMENT POLICY METHODS AND SYSTEMS

(71) Applicant: Samsung Electronics Co., Ltd., Suwon-si, Gyeonggi-do (KR)

(72) Inventors: Kevin Lepak, Austin, TX (US); Tarun Nakra, Austin, TX (US); Khang Nguyen, Round Rock, TX (US); Murali Chinnakonda, Austin, TX (US); Edwin Silvera, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 146 days.

(21) Appl. No.: 14/269,032

(22) Filed: May 2, 2014

(65) Prior Publication Data

US 2015/0186280 A1    Jul. 2, 2015

Related U.S. Application Data

(60) Provisional application No. 61/922,799, filed on Dec. 31, 2013.

(51) Int. Cl.
*G06F 12/12* (2016.01)
(52) U.S. Cl.
CPC .................... *G06F 12/121* (2013.01)
(58) Field of Classification Search
CPC .................................................. G06F 12/121
See application file for complete search history.

(56) References Cited

U.S. PATENT DOCUMENTS

| 7,284,095 | B2 | 10/2007 | Hu et al. |
| 7,502,889 | B2 | 3/2009 | Sistla |
| 2012/0311269 | A1 | 12/2012 | Loh et al. |
| 2013/0151781 | A1 | 6/2013 | Wang et al. |
| 2014/0173214 | A1* | 6/2014 | Ramrakhyani ....... G06F 12/126 711/135 |

OTHER PUBLICATIONS

Jaleel et al, "High Performance Cache Replacement Using Re-Reference Interval Prediction (RRIP)", ISCA '10, Jun. 19-23, 2010, Saint-Malo, France, Copyright 2010 ACM.

* cited by examiner

*Primary Examiner* — Edward Dudek, Jr.
(74) *Attorney, Agent, or Firm* — Renaissance IP Law Group LLP

(57) ABSTRACT

An embodiment includes a system, comprising: a cache configured to store a plurality of cache lines, each cache line associated with a priority state from among N priority states; and a controller coupled to the cache and configured to: search the cache lines for a cache line with a lowest priority state of the priority states to use as a victim cache line; if the cache line with the lowest priority state is not found, reduce the priority state of at least one of the cache lines; and select a random cache line of the cache lines as the victim cache line if, after performing each of the searching of the cache lines and the reducing of the priority state of at least one cache line K times, the cache line with the lowest priority state is not found. N is an integer greater than or equal to 3; and K is an integer greater than or equal to 1 and less than or equal to N−2.

20 Claims, 8 Drawing Sheets

CACHE REPLACEMENT POLICY METHODS AND SYSTEMS

BACKGROUND

This disclosure relates to cache replacement policy methods and systems and, in particular, to cache replacement policy methods and systems with lower latency.

In some cache replacement policies, cache lines are associated with values used to determine which line of a cache may be replaced with new data from memory on a cache miss. For example, the value may be a "not recently used" (NRU) bit, a "re-reference prediction value" (RRPV), or the like. However, when determining the line to replace, latency may increase as a search algorithm may iterate over every state of the value.

SUMMARY

An embodiment includes a system, comprising: a cache configured to store a plurality of cache lines, each cache line associated with a priority state from among N priority states; and a controller coupled to the cache and configured to: search the cache lines for a cache line with the lowest priority state of the priority states to use as a victim cache line; if the cache line with the lowest priority state is not found, reduce the priority state of at least one of the cache lines; and select a random cache line of the cache lines as the victim cache line if, after performing each of the searching of the cache lines and the reducing of the priority state of at least one cache line K times, the cache line with the lowest priority state is not found. N is an integer greater than or equal to 3; and K is an integer greater than or equal to 1 and less than or equal to N−2. In a particular embodiment, the next victim cache line may be pre-computed on every cache hit and miss and stored as part of the cache state.

An embodiment includes a method, comprising: searching a plurality of cache lines, each cache line associated with a priority state from among N priority states, for a cache line with the lowest priority state of the priority states to use as a victim cache line; if the cache line with the lowest priority state is not found, reducing a priority state of at least one of the cache lines; and selecting a random cache line of the cache lines as the victim cache line if, after performing each of the searching of the cache lines and the reducing of the priority state of at least one cache line K times, the cache line with the lowest priority state is not found. N is an integer greater than or equal to 3; and K is an integer greater than or equal to 1 and less than or equal to N−2.

An embodiment includes a system, comprising: a cache configured to store a plurality of cache lines, each cache line associated with a priority state from among N priority states; and a controller coupled to the cache and configured to: on a cache miss, determine a next victim cache line of the cache in parallel with filling a current victim cache line of the cache; on a cache hit, determine the next victim cache line of the cache; and on a subsequent cache access, use the next victim cache line as the current victim cache line.

DETAILED DESCRIPTION

Figure 1:
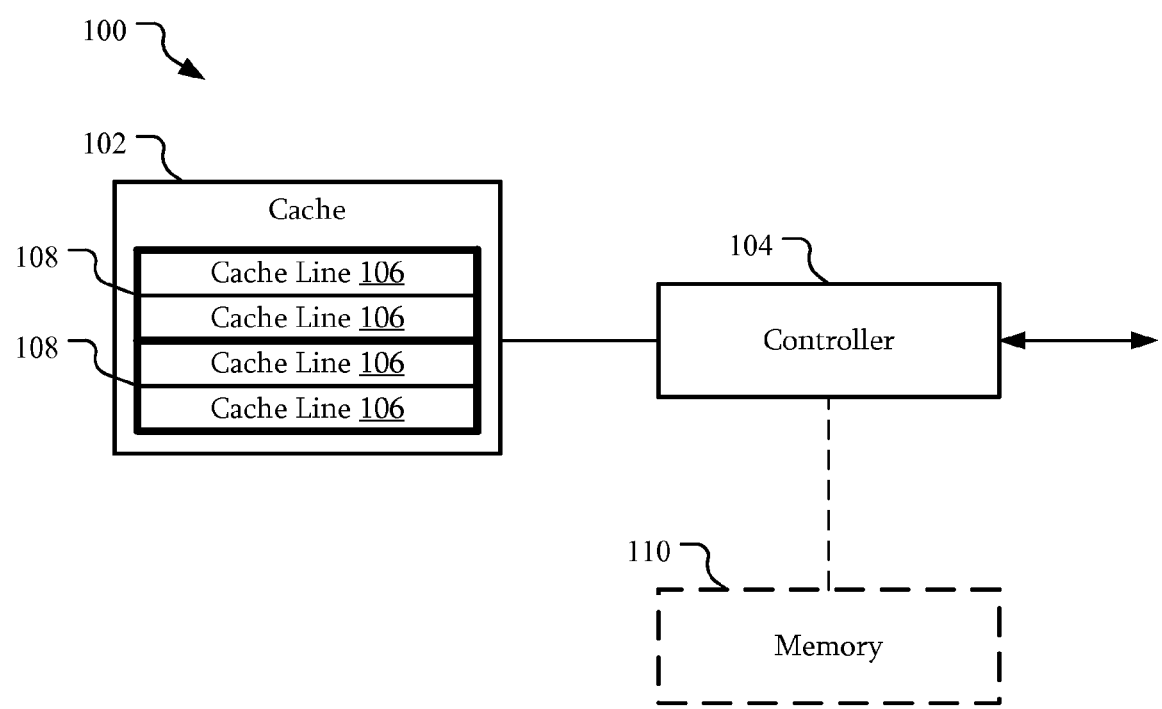
FIG. 1 is a schematic view of a cache system according to an embodiment.

The embodiments relate to cache replacement policy methods and systems with lower latency. The following description is presented to enable one of ordinary skill in the art to make and use the embodiments and is provided in the context of a patent application and its requirements. Various modifications to the exemplary embodiments and the generic principles and features described herein will be readily apparent. The exemplary embodiments are mainly described in terms of particular methods and systems provided in particular implementations.

However, the methods and systems will operate effectively in other implementations. Phrases such as "exemplary embodiment", "one embodiment" and "another embodiment" may refer to the same or different embodiments as well as to multiple embodiments. The embodiments will be described with respect to systems and/or devices having certain components. However, the systems and/or devices may include more or less components than those shown, and variations in the arrangement and type of the components may be made without departing from the scope of this disclosure. The exemplary embodiments will also be described in the context of particular methods having certain steps. However, the method and system operate effectively for other methods having different and/or additional steps and steps in different orders that are not inconsistent with the exemplary embodiments. Thus, embodiments are not intended to be limited to the particular embodiments shown, but are to be accorded the widest scope consistent with the principles and features described herein.

The exemplary embodiments are described in the context of particular systems having certain components. One of ordinary skill in the art will readily recognize that embodiments are consistent with the use of systems having other and/or additional components and/or other features. The method and system are also described in the context of single elements. However, one of ordinary skill in the art will readily recognize that the method and system are consistent with the use of systems having multiple elements.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. Furthermore, in those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

FIG. 1 is a schematic view of a cache system according to an embodiment. In this embodiment, the cache system 100 includes a cache 102 and a controller 104. The cache 102 is configured to store cache lines 106. Each cache line 106 may be configured to store cached data, a priority state, address information, tags, or the like. Although a particular a particular grouping of the information associated with a cache line 106 has been described, the cache system 100 may store such information in other of ways. For example, the cache lines 106 may be stored in a first memory while other information, such as the states and the tags for the cache lines 106 may be stored in a second memory.

The cache system 100 may be used in a variety of applications. For example, the cache system 100 may operate as a cache between a processor and system memory. In another example, the cache system 100 may operate as a cache between a physical storage medium and a storage device interface. The cache system 100 may be used anywhere where data may get accessed multiple times.

The cache system 100 may be configured to operate as an N-way associative cache. For example, the cache system 100 may be configured to operate as a 2-way associative cache. Here, two lines 106 are illustrated for each index 108 of the cache. However, in other embodiments, the cache system 100 may have other levels of associativity, including being a fully associative cache.

The controller 104 is coupled to the cache 102. In this embodiment, the controller 104 is the interface between the cache 102 and a system bus (not illustrated). However, in other embodiments, access to a memory 110, may be performed through the controller 104.

The controller 104 may be implemented in a variety of ways. For example, the controller 104 may include logic circuitry on an integrated circuit, system on a chip, or other system with a processor and the cache 102. In another example, the controller 104 may include a separate processor, microcontroller, programmable logic device, a combination of such devices or the like.

In an embodiment, the cache system 100 may act as the only cache for a system. However, in other embodiments, the cache system 100 may be a level in a multi-level cache system. For example, the cache system 100 may implement a last level cache (LLC), an L2 cache, or the like. In a particular embodiment, a system may use the cache system 100 for several cache levels. For example, an L2 and an L3 cache may each be implemented similar to the cache system 100.

Figure 2:
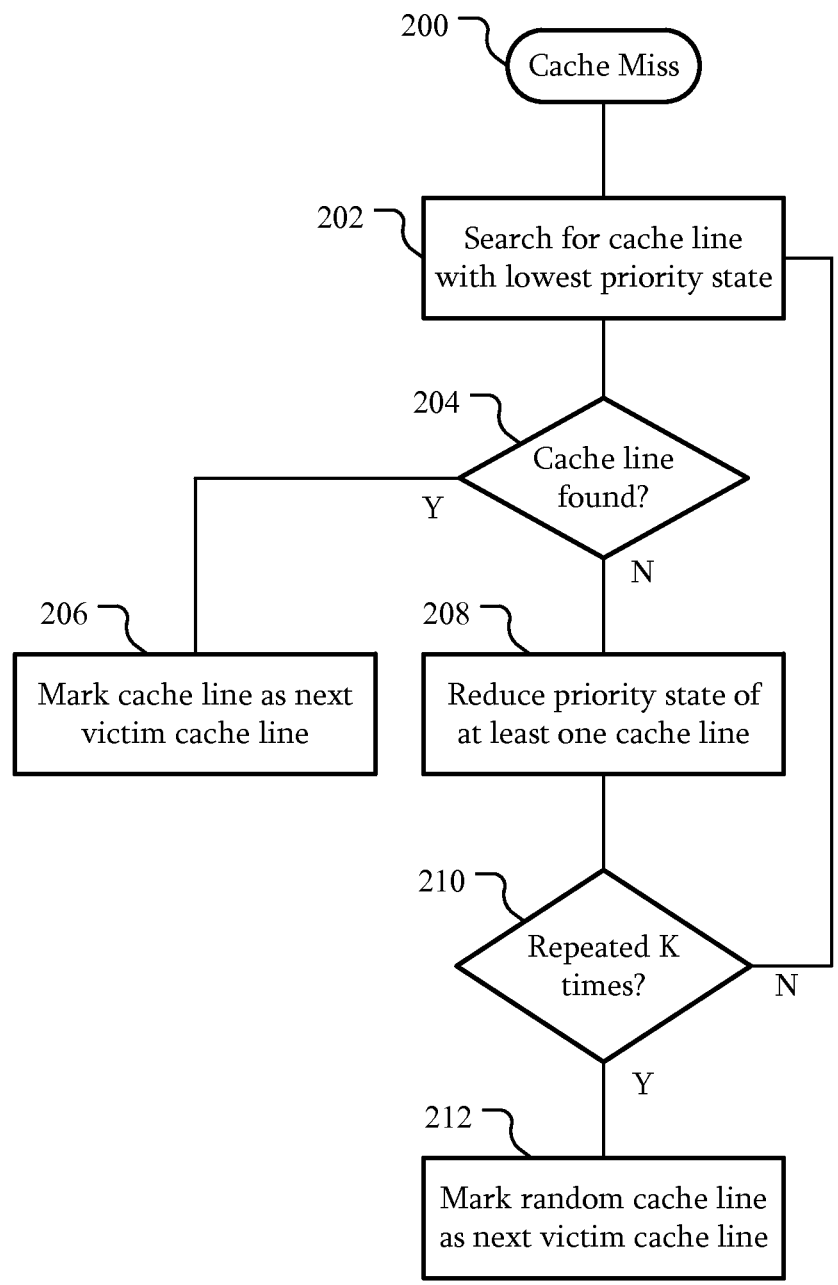
FIG. 2 is a flowchart illustrating finding a next victim cache line according to an embodiment.

FIG. 2 is a flowchart illustrating finding a next victim cache line according to an embodiment. Referring to FIGS. 1 and 2, in 200, an access to the cache 102 missed. In 202, the controller 104 is configured to search for a line 106 with the lowest priority state. As used herein, the priority state is an indication related to whether an associated cache line 106 may be selected as a victim cache line.

In this embodiment, there are N potential priority states where N is an integer greater than or equal to three. For example, N may be 4 and the priority states may be a least recently used (LRU) state, an LRU+1 state, an LRU+2 state, and an LRU+3 state. A lowest priority state may be the LRU state. As used herein, the lowest priority state may be the state at which a line is most likely to be used as a victim cache line. Reducing a priority state may make the associated cache line more likely to be used as a victim cache line, just as increasing the state may make the cache line less likely to be used as a victim cache line. Although lowest, reducing, increasing, and the like are described herein, the terms may have different meaning depending on the particular encoding of the priority state. For example, an LRU state may be represented by a value of 3 while an MRU state may be represented by a value of 0. Using increasing as an example, when increasing the priority state, the actual value may be reduced.

In 202, the controller 104 is configured to search the cache lines 106 for a cache line 106 with a lowest priority state of the priority states to use as a victim cache line. For example, the controller 104 may be configured to search for a cache line 106 having an LRU state. If the cache line 106 with the lowest priority state is found in 204, in 206, the controller 104 may be configured to mark the cache line 106 as the next victim cache line.

If the controller 104 has not found the cache line 106 with the lowest priority state, in 208, the priority state of at least one cache line 106 is reduced. In an embodiment, the cache lines 106 having the respective priority states reduced may include all cache lines of an associated index 108, all cache lines 106 of the cache 102, or the like. However, in other embodiments, all of such cache lines 106 need not have the respective priorities reduced. For example, as will be described below, a cache line to be filled may be predetermined before a cache miss. This cache line 106 may be excluded from the cache lines 106 having the priority states reduced.

After reducing the priority in 208, the controller 104 is configured to determine if the process of searching in 202, not finding a line in 204 and reducing the priority state in 208 has been repeated K times where K is an integer greater than or equal to 1 and less than or equal to N−2. For example, if N is 4, K may be 1 or 2. If the processes have not been repeated K times, the flow may return to 202 to search for a line with the lowest priority state. As the priority state for at least one line was reduced in 208, at least one line may now have the lowest priority. Since K<N−1, the search process does not guarantee to find a line with the lowest priority; however, the line that is found may still be a line with the lowest priority.

However, if the processes have been repeated K times, in 212, a random cache line 106 may be selected as the next victim cache line. The random cache line 106 may be selected in a variety of ways. For example, a random number generator may be used to select a victim cache line. In another example, a modulo operation may be performed on an event, counter, or other value that changes over time. In a particular example, the next victim cache line may be selected by calculating the value modulo a number of ways or lines.

In contrast, to other cache replacement policies, in an embodiment, only a window of priority states is searched. Using the example of N=4, K=2, and the states being LRU, LRU+1, LRU+2, and LRU+3, only states having either the LRU state or the LRU+1 state at the time of the cache miss in 200 may be selected based on the state. In particular, if a cache line 106 has the LRU state, that cache line 106 will be found in 202 and marked as the next victim cache line in 206. If no cache line 106 has the LRU state, but a cache line 106 has the LRU+1 state, a cache line will still not be found in the first searching in 202. The cache line having the LRU+1 state may be reduced in 208 and the searching repeated in 202. As the previous cache line 106 with the LRU+1 state now has the LRU state, that cache line 106 may be found and marked as the next victim cache line in 206.

Finally, if no cache lines 106 have the LRU or LRU+1 state initially, when the searching in 202 and reducing of the priority in 208 has been performed 2 times, a random cache line 106 may be marked as the next victim cache line in 212. By this time, a cache line 106 may have the LRU state. That is, the initial state of the priority for the cache line 106 may have been LRU+2. The state was reduced to LRU due to the priority reduction being performed in 208 twice. However, the cache lines 106 are not searched again. Rather, a random cache line 106 is selected. As a result, only a window of less than all of the priority states, i.e., in this example, LRU and LRU+1, is searched before a random cache line 106 is selected.

More generally, the controller 104 need not iterate over all cache lines 106 of a given index 108 more than K times. In particular, where the associativity of a cache 102 and/or the number of priority states are relatively high, the limit of K searches for a lowest priority cache line 106 before a random cache line 106 is selected may reduce a time to find a cache line to fill and hence, reduce latency.

Although an example where N is 4 has been described above, N may take other values. For example in another embodiment N may be 8. Accordingly, the cache lines 106 may be associated with a priority state of 8 different states. As a result, the number of times K that the searching and priority reducing are performed may be larger than the example of 2 given above. In this example, K may be between 1 and 6, inclusive.

Although the number of times K that the searching and priority reducing are performed has been defined by the number of priority states, for values of N where K may take multiple values, the value of K may, but need not be constant between different markings of the next victim cache line. Using the example of N=4 for illustration, after a first cache miss in 200, K may be 2. Thus, the searching and priority reducing may be performed up to two times. However, for a second cache miss 200, the controller 104 may be configured to use a value of 1 for K. Thus, in the second process of marking a next victim cache line, the controller 104 may be configured to perform the searching and priority reducing may only up to one time.

Moreover, although this embodiment is illustrated as being performed after a cache miss in 200, the performance may occur at other times. As will be described in further detail below, finding a next victim cache line may be performed in series or in parallel with filling a victim cache line 106 of the cache 102.

Figure 3:
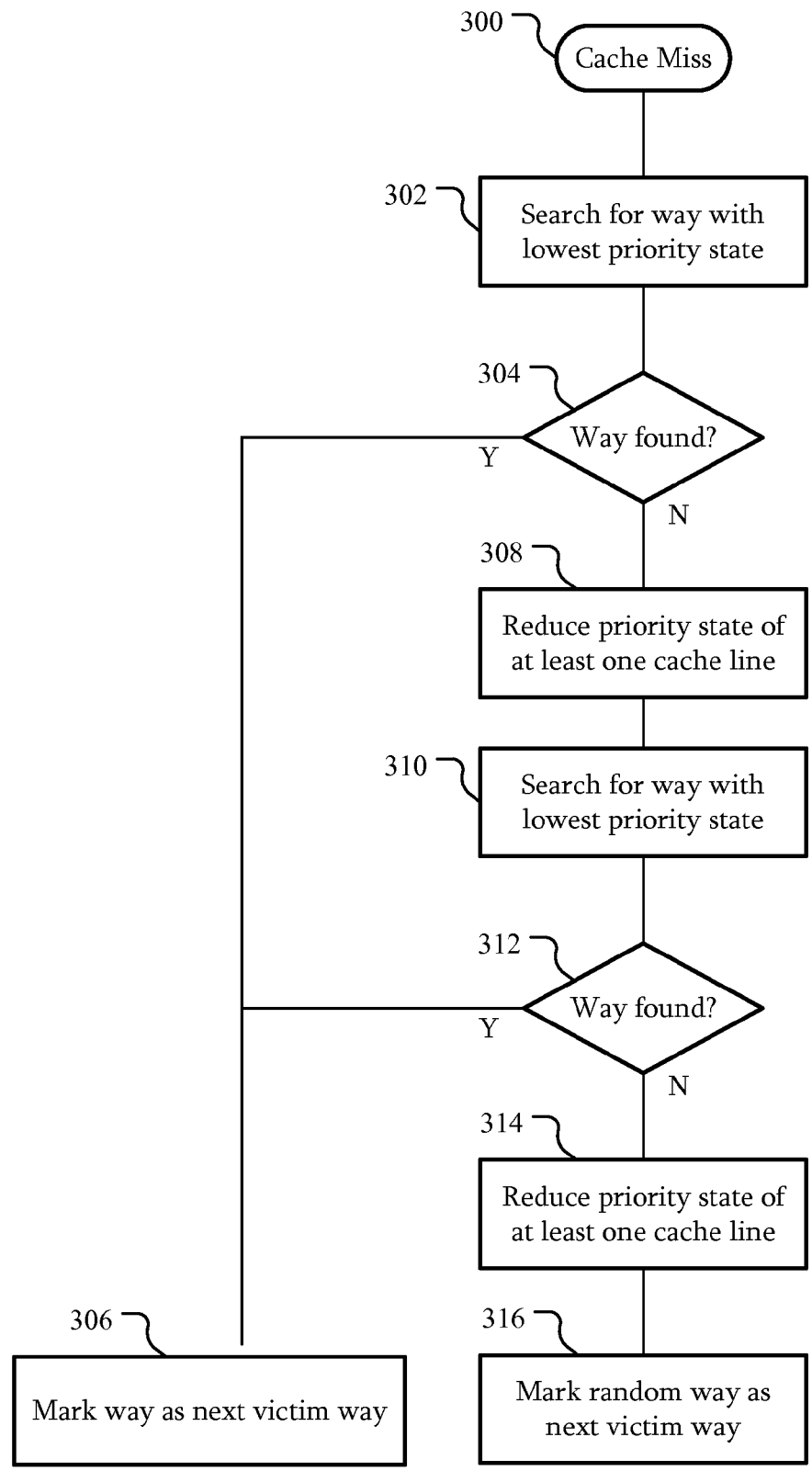
FIG. 3 is a flowchart illustrating finding a next victim way according to an embodiment.

FIG. 3 is a flowchart illustrating finding a next victim way according to an embodiment. Referring to FIGS. 1 and 3, the process begins with a cache miss in 300. Similar to the searching for a line with the lowest priority in 202 and if that line is found in 204, that line is marked as the next victim cache line in 206, the controller 104 is configured to search for a way with the lowest priority in 302 and if the way is found in 304, the way is marked as the next victim way in 306. However, in this embodiment, the algorithm searches for a way. Accordingly, in some embodiments, the entity that is the subject of a search may be any association of a priority state with a line, way, or the like.

Similar to reducing a priority of at least one line in 208, if a way is not found in 304, a priority of at least one cache line is reduced in 308. However, in this embodiment, rather than looping, a search for a way with the lowest priority is performed again in 310, checked if the way is found in 312, and if not, the priority of at least one line is reduced again in 314. In other words, in this embodiment, the number of times the searching and priority reducing is repeated is up to two. If after two repetitions a way is not found, a random way is marked in 316 as the next victim way. In contrast to the process of FIG. 2, a particular window size of 2 priority states, e.g., LRU and LRU+1, is searched to find the next victim way before marking a random way.

Figure 4:
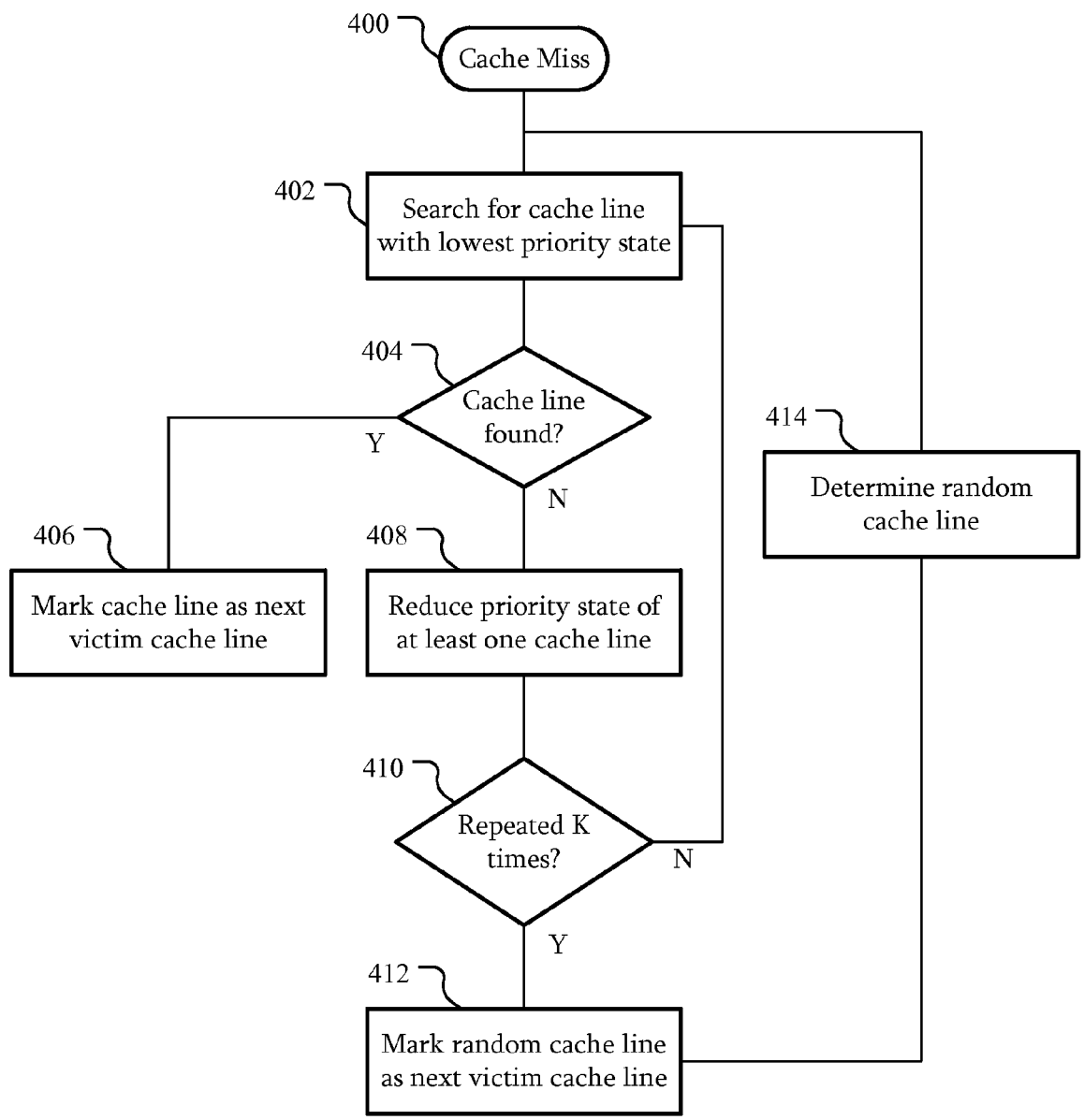
FIG. 4 is a flowchart illustrating finding a next victim cache line according to another embodiment.

FIG. 4 is a flowchart illustrating finding a next victim cache line according to another embodiment. Referring to FIGS. 1 and 4, in this embodiment, searching for the line in 402, checking if the line is found in 404, marking the next victim cache line in 406, reducing the priority in 408, repeating K times in 410, and marking a random next victim cache line 412 are similar to the corresponding operations 202, 204, 206, 208, 210, and 212, described above. However, in this embodiment, the controller 104 is configured to perform the determination of the random cache line in 414 in parallel with the other operations. That is, while a search is being performed for a next victim cache line, a random cache line is selected so that if the searching in 402 and reducing in 408 have been performed K times, the random cache line may be marked as the next victim cache line without waiting for a determination of that random cache line.

Although the beginning of determining the random cache line in 414 is illustrated as being after the cache miss in 400 and before and/or contemporaneous with searching in 402, determining the random cache line in 414 may begin at different times. For example, the controller 104 may be configured to start the determining the random cache line in 414 after the first time the line is not found in 404, after the first time the number of times the searching and reducing have been performed is checked against K in 410, or the like. In a particular embodiment, the controller 104 may be configured to start determining the random cache line in 414 at a time sufficient to determine the random cache line before the random cache line's identity is used in 412. Thus, when the random cache line is to be marked in 412, the random cache line is already selected.

Figure 5:
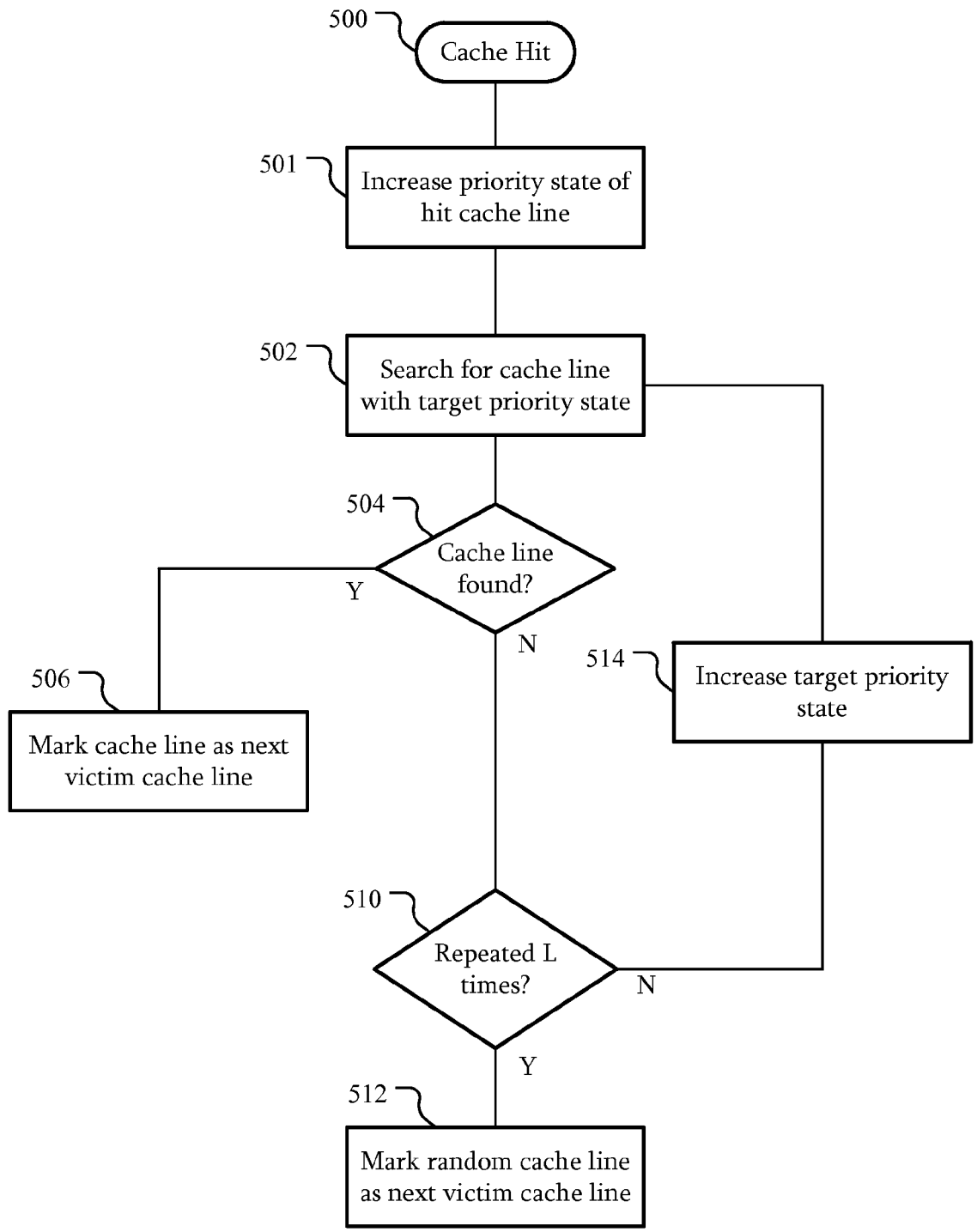
FIG. 5 is a flowchart illustrating finding a next victim cache line on a cache hit according to an embodiment.

FIG. 5 is a flowchart illustrating finding a next victim cache line on a cache hit according to an embodiment. Referring to FIGS. 1 and 5, this embodiment begins with a cache hit in 500, in contrast to the cache misses described above with respect to FIGS. 2-4. The controller 104 is configured to increase a priority of the hit line in 501. Subsequently, a next victim cache line is marked. In particular, the controller 104 is configured to search for a cache line 106 with a target priority state in 502. For example, the target priority may be an LRU priority state or other state indicating a higher likelihood that the cache line 106 should be filled at a later time. In particular, the target priority state may be the lowest priority state.

If the line with the target priority is found in 504, the controller 104 is configured to mark that cache line 106 as the next victim cache line in 506. If the cache line 106 is not found in 504, the number of times the search in 502 has been performed is compared against L where L is an integer greater than or equal to 1. In addition, L may be less than or equal to N−2, i.e., the number of priority states N minus 2.

If the searching has not been repeated L times, the controller 104 is configured to increase the target priority state in 514. For example, if the initial target priority was LRU, the next target priority may be LRU+1. The controller 104 may be configured to perform the search in 502 again with the new target priority state. If the searching in 502 has been repeated L times, the controller 104 is configured to mark a random cache line as the next victim cache line in 512.

Accordingly, the next victim cache line is marked by searching only over a subset of the priority states. Using the example of N=4, L=2, and priority states of LRU through LRU+3, the initial target priority state may be LRU. If no cache line 106 with the LRU priority state is found, the target priority state is incremented to LRU+1. If no cache line 106 with the LRU+1 priority state is found, a random cache line is marked. Accordingly, only the LRU and LRU+1 states of the possible LRU through LRU+3 states are searched before a random cache line is selected.

Just as K may be different during different operations as described above with respect to FIG. 2 and cache misses, in this embodiment, L may be different during different operations. For example, after a first cache hit, L may be 1 while after a second cache hit, L may be 2.

Figure 6:
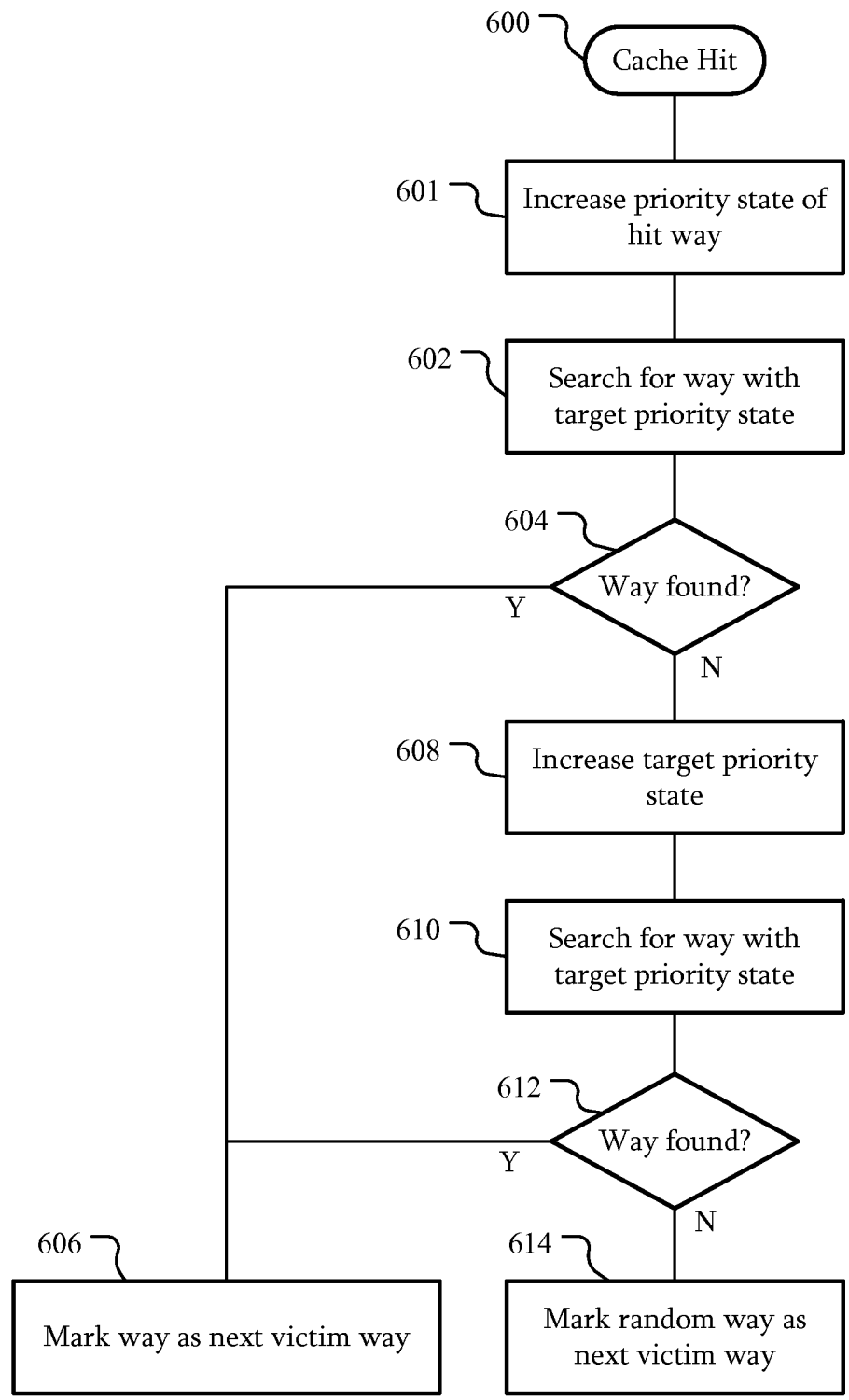
FIG. 6 is a flowchart illustrating finding a next victim way on a cache hit according to an embodiment.

FIG. 6 is a flowchart illustrating finding a next victim way on a cache hit according to an embodiment. This embodiment begins with a cache hit 600, in contrast to the cache miss 300 described above with respect to FIG. 3. Referring to FIGS. 1 and 6, in this embodiment, the controller is configured to increase a priority state of a hit way in 601 and perform a search for a way with a target priority state in 602 similar to 501 and 502 of FIG. 5. However, similar to the difference between FIGS. 2 and 3, FIG. 6 illustrates a particular window size of 2 target priority states when performing a search for a way before marking a random way.

If a way is found in 604, the controller 104 is configured to mark that way as the next victim way in 606. If not, the controller 104 is configured to increase the target priority state in 608 and search for a way with the new target priority state in 610. If a way with the new target priority state is found in 612, the controller 104 is configured to mark that way as the next victim way in 606. If not, the controller 104 is configured to mark a random way as the next victim way.

Similar to FIG. 4, in both FIGS. 5 and 6, the random cache line or way may be determined in parallel with the searching for the next victim way. Moreover, the determination of a random way or line may similarly begin at a variety of times.

Figure 7:
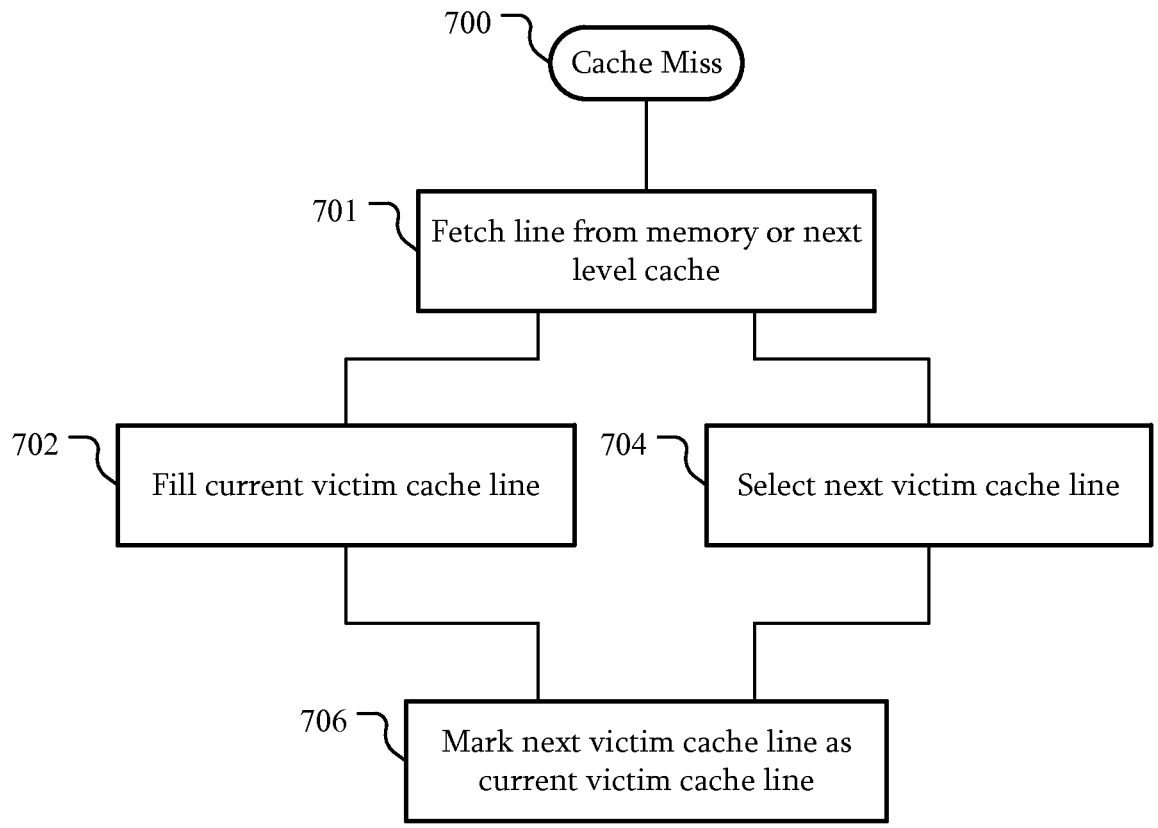
FIG. 7 is a flowchart illustrating filling a current victim cache line in parallel with selecting a next victim cache line according to an embodiment.

FIG. 7 is a flowchart illustrating filling a current victim cache line in parallel with selecting a next victim cache line according to an embodiment. Referring to FIGS. 1 and 7, in this embodiment, a cache miss occurs in 700. In 701, a line is fetched. For example, the line may be fetched from memory, a next level cache, or the like. In 702, the controller 104 is configured to fill a current victim cache line. The current victim cache line is a cache line that was previously determined. For example, any of the above techniques for marking a next victim cache line may have been used to mark the current victim cache line. The current victim cache line may be stored as part of a state of the cache 102.

In parallel with filling the victim cache line in 702, the controller 104 is configured to select a next victim cache line in 704. Any technique of selecting a next victim cache line, including those described above, may be used to select the next victim cache line. In a particular embodiment, at least one of the searching of the cache lines 106, the reducing of the priority state of at least one cache line 106, and the selecting of the random cache line of the cache lines 106 as the victim cache line may be performed in parallel with filling the current victim cache line in 702. Moreover, although selecting the next victim cache line in 704 has been illustrated as occurring after fetching the line in 701, the selection of the next victim cache line in 704 may be performed in parallel, in whole or in part, with the fetching of the line in 701.

As the current victim cache line is being filled in 702 in parallel with selecting a next victim cache line in 704, the current victim cache line may be excluded from the cache lines when reducing the priority state of the cache lines as described above with respect to FIGS. 2-4.

In 706, the controller 104 is configured to mark the next victim cache line selected in 704 as the current victim cache line. Accordingly, the victim cache line selected in 704 may be the victim cache line filled in a subsequent cache miss 700. As the current victim cache lines are determined before the cache miss 700 in which they are used for a fill, the fill in 702 need not wait for the victim cache line to be determined. Moreover, as the current victim cache line for a subsequent fill is determined in 704 in parallel, the time for that operation need not delay the filling in 702. Accordingly, a latency of a cache fill may be reduced.

Figure 8:
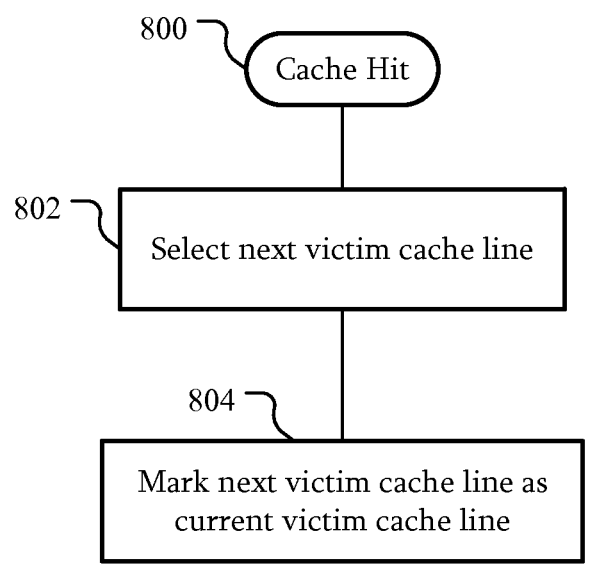
FIG. 8 is a flowchart illustrating finding a next victim cache line on a cache hit according to an embodiment.

FIG. 8 is a flowchart illustrating finding a next victim cache line on a cache hit according to an embodiment. Referring to FIGS. 1 and 8, this embodiment begins with a cache hit in 800. For clarity, other operations related to a cache hit are not illustrated. After the cache hit in 800, the controller 104 is configured to select a next victim cache line in 802. The selection of the next victim cache line may be performed using any selection technique, including those described with respect to FIGS. 5 and 6. The selected next victim cache line is marked as the current victim cache line in 804.

As a result, on a subsequent cache access, that current victim cache line marked during a cache hit may be used for a fill. For example, the current victim cache line that is filled in 702 of FIG. 7 may be the next victim cache line selected in 802 during an earlier cache hit. That is, in some embodiments, the current victim cache line may be selected after a cache hit or a cache miss, such as in either 704 of FIG. 7 or 802. Regardless of how the current victim cache line is selected, it is available to be used for a fill with a reduced or eliminated delay due to marking the cache line 106 as the current victim cache line.

In an embodiment, the cache 102 may be an L2 cache, an LLC cache, or the like. A cache line in an L1 cache or other lower level cache may be evicted. The evicted L1 cache line will be used as an example. The controller 104 may be configured to receive an update indicating that a cache line the L1 cache was evicted. In response to the update, the controller 104 does not update a priority state of a cache line 106 in the cache 102 associated with the cache line in the L1 cache. In particular, where the cache 102 is an inclusive cache, including the lines of the L1 cache, the controller 104 may not have sufficient information to decide whether to evict the associated cache line 106, reduce its priority, or the like. Accordingly, the priority may be left the same in response to the update.

An embodiment may include a combination of such operations described above on a cache hit with operations described above on a cache miss. For example, an embodiment may include a cache replacement policy that is a combination of FIGS. 3 and 6. This policy may be used in higher-level caches (such as L2 and LLC caches) where the access pattern gets filtered by low-order caches. The replacement policy may use multiple passes over cache line states for selecting a victim for eviction. In an embodiment the latency of multiple passes may be reduced by operating over a limited window of the entire replacement search space. If the search window does not yield a victim, the system may fall back on a secondary scheme to generate a victim, such as selecting a random cache line.

In an embodiment, the performance of such a hybrid scheme may be able to cover most of the accuracy of a complete search algorithm at a lower latency that may be more favorable for implementation. Other embodiments may further improve the timing of victim-selection by doing an early computation of the next victim. The victim information may be retained as part of each cache index state until either an eviction is generated, or the victim needs to be recomputed due to a change in the cache index's replacement state.

A particular embodiment includes an L2 replacement design. This replacement algorithm uses the concept of associating an "age" or replacement state with each line within a cache index. For this description, assume the different states associated with a line to be LRU, LRU+1, LRU+2 etc. The LRU (Least-recently used) state indicates the corresponding line to be a candidate for eviction. Each L2 line access may increase the line's state (from LRU+delta to LRU+delta+1). It is possible for multiple lines to be associated with a single state value. When a cache line needs to be replaced, the algorithm uses the state information across all lines of the cache index to identify a victim. In case there are no lines in the LRU state, all the lines decrement ("age") their state until at least one line reaches the LRU state. The victim selection can require multiple iterations of state update which can cover multiple cycles in implementation. For victim selection, n replacement states may use up to n−2 state updates to find a victim. After the n−2 state updates, another selection technique, such as the random selection technique, may be used to select the next victim cache line. In a particular embodiment, this selection technique does not iterate across the lines associated with a cache index.

Embodiments may address timing constraints in several ways. For example, the victim selection may be pre-computed after every update to the replacement state within a set. In one embodiment, the transactions that involve replacement state updates would include L2 fills and L2 hits. The early computation allows the victim information to be immediately available at the time of replacement. The victim way may be stored as part of the state of each cache index, and may use requires log(m) bits where m is the cache associativity.

In some embodiments, the victim search and aging is performed within a limited window of total possible replacement state space. In one embodiment, all existing lines would be aged within a cache index (i.e. shift their states until one line reaches the LRU state) up to two times. Also, instead of aging the lines prior to victim selection, an embodiment updates the lines' age after every fill insertion. Such operation may be iso-performance to other replacement algorithms, but at the advantage of moving the aging logic off the critical path of victim selection. Since the aging process is post-fill and limited to a fixed window depth, it may not guarantee that at least a line is in the LRU state at the time of victim selection. Instead, embodiments propose the selection logic to iterate across the victim candidates for a fixed number of times. An embodiment searches for a victim in either LRU or LRU+1 state (2 iteration search space). If no victim is found within the two iterations, the victim is selected using a random replacement (where randomization may be based on some internal event counter). Performance studies have indicated that the majority of victims can be captured within the two-wide LRU window.

In an embodiment, pre-computing the victim (after each L2 hit or fill) and using a limited window for aging and victim search allows the replacement logic to be built without significant timing overhead. Performance analysis indicates this hybrid replacement scheme may be near-performing to other replacement algorithms, but using a more timing optimal design.

In a particular embodiment, assume a 2-bit per way LRU state: LRU, LRU+1, LRU+2, LRU+3. Upon an L2 cache hit, increment the LRU state of line by 1. e.g. from LRU to LRU+1 and pre-compute the next victim as follows. First, iterate over all lines within the cache index to find a first way with state=LRU and mark the line as the next victim way. If no line is found as a victim, iterate over all lines to find the first way with state=LRU+1 and mark that line as the next victim way. If no line is found, select the next victim way using random replacement.

Upon an L2 cache fill, insert the line into the victim way and initialize the state to (for example) LRU+1. Decrement the state for all other ways by 1 unless there's already a line in the LRU state. Repeat the above step, possibly decrementing LRU state one more time. Pre-compute the next victim similar to a cache hit.

Upon an L2 update with an L1 victim, do not change in LRU state or victim selection.

In an alternative embodiment, the total number of LRU states may be larger than what was assumed above. For example, a 3-bit state encoding would support up to 8 replacement states. In another embodiment, the window depth for aging and victim selection may be different than what was assumed above (especially larger if there are more total replacement states).

Other embodiments may initialize or update the replacement state differently than the above description. For example, cache hits may decrement the LRU state of all the other lines in the set (other than the line that hits). Also, the line state of the cache hit may get updated to the "most-recently-used" state, or {LRU+n−1}, where n=total possible states.

Although the various techniques described herein may be used to mark a next victim cache line to be used in a subsequent cache fill, in other embodiments, the techniques described herein may be used to mark a next victim cache line to be used in a current cache fill. That is, before a current fill is performed, a next victim cache line may be marked as described herein and used as the victim cache line for the fill.

Figure 9:
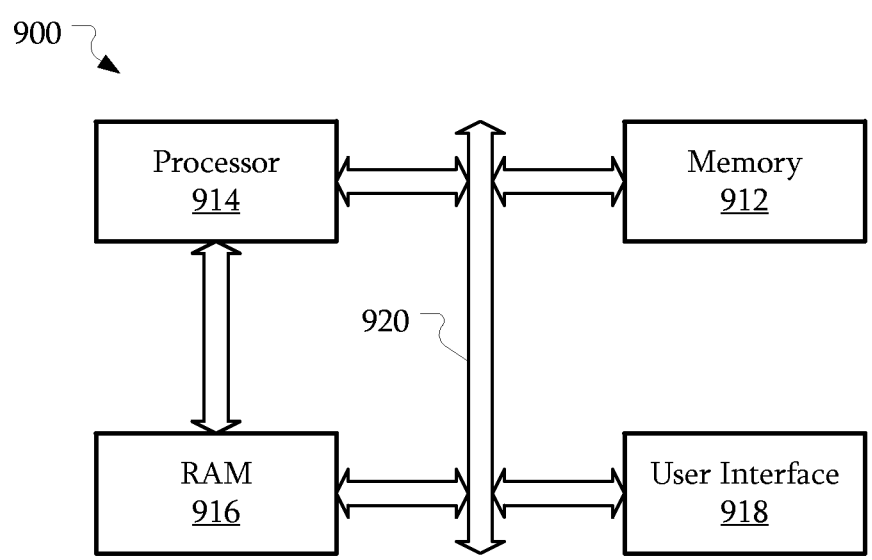
FIG. 9 is a schematic view of an electronic system which may include a cache controller according to an embodiment.

FIG. 9 is a schematic view of an electronic system which may include a cache controller according to an embodiment. The electronic system 900 may be part of a wide variety of electronic devices including, but not limited to portable notebook computers, Ultra-Mobile PCs (UMPC), Tablet PCs, desktop PCs, servers, workstations, mobile telecommunication devices, and so on. For example, the electronic system 900 may include a memory system 912, a processor 914, RAM 916, and a user interface 918, which may execute data communication using a bus 920.

The processor 914 may be a microprocessor or a mobile processor (AP). The processor 914 may have a processor core (not illustrated) that can include a floating point unit (FPU), an arithmetic logic unit (ALU), a graphics processing unit (GPU), and a digital signal processing core (DSP Core), or any combinations thereof. The processor 914 may execute the program and control the electronic system 900. The processor 914 may include a cache system 100 as described above.

The RAM 916 may be used as an operation memory of the processor 914. Alternatively, the processor 914 and the RAM 916 may be packaged in a single package body. A cache system 100 as described above may operate as a cache between the processor 914 and the RAM 916.

The user interface 918 may be used in inputting/outputting data to/from the electronic system 900. The memory system 912 may store codes for operating the processor 914, data processed by the processor 914, or externally input data. The memory system 912 may include a controller and a memory. The memory system may include an interface to computer readable media. Such computer readable media may store instructions to perform the variety of operations describe above.

Although the structures, methods, and systems have been described in accordance with exemplary embodiments, one of ordinary skill in the art will readily recognize that many variations to the disclosed embodiments are possible, and any variations should therefore be considered to be within the spirit and scope of the apparatus, method, and system disclosed herein. Accordingly, many modifications may be made by one of ordinary skill in the art without departing from the spirit and scope of the appended claims.

The invention claimed is:

1. A system, comprising:
   a cache configured to store a plurality of cache lines, each cache line associated with a priority state from among N priority states; and
   a controller coupled to the cache and configured to:
      search the cache lines for a cache line with a lowest priority state of the priority states to use as a victim cache line;
      if no cache line with the lowest priority state is found, reduce the priority state of at least one of the cache lines; and
      select a random cache line of the cache lines as the victim cache line instead of performing the searching of the cache lines if, after performing each of the searching of the cache lines and the reducing of the priority state of at least one cache line K times, no cache line with the lowest priority state is found;
   wherein:
      N is an integer greater than or equal to 3; and
      K is an integer greater than or equal to 1 and less than or equal to N−2.

2. The system of claim 1, wherein N is 4.

3. The system of claim 2, wherein K is 2.

4. The system of claim 1, wherein N is greater than or equal to 8.

5. The system of claim 1, wherein the controller is further configured to, on a cache hit, increase the priority state of the cache line associated with the cache hit.

6. The system of claim 1, wherein the victim cache line is a next victim cache line to be filled after a subsequent cache miss.

7. The system of claim 6, wherein the controller is further configured to, after a cache hit:
   search the cache lines for a cache line with a priority state equal to a target state one to L times, beginning with a target state of the lowest priority state and incrementing the target state for any subsequent search associated with the cache hit;
   if the cache line with the priority state equal to the target state is found, select that cache line as the next victim cache line; and
   if the cache line with the priority state equal to the target state is not found after L searches, select a random cache line of the cache lines as the next victim cache line;
   wherein L is an integer greater than or equal to 1 and less than or equal to N−2.

8. The system of claim 6, wherein during the subsequent cache miss, the controller is further configured to exclude the next victim cache line from the at least one of the cache lines when reducing the priority state of the at least one of the cache lines.

9. The system of claim 1, wherein the controller is further configured to perform at least one of the searching of the cache lines, the reducing of the priority state of at least one cache line, and the selecting of the random cache line of the cache lines as the victim cache line in parallel with a cache fill.

10. The system of claim 1, wherein the controller is further configured to determine the random cache line in parallel with at least one of the searching of the cache lines and the reducing of the priority state.

11. The system of claim 1, wherein:
   the cache is referred to as a first cache; and
   the controller is further configured to:
      receive an update indicating that a cache line from a second cache was evicted; and
      not update a priority state of a cache line in the first cache associated with the cache line from the second cache in response to the update.

12. A method, comprising:
   searching a plurality of cache lines, each cache line associated with a priority state from among N priority states, for a cache line with a lowest priority state of the priority states to use as a victim cache line;
   if no cache line with the lowest priority state is found, reducing a priority state of at least one of the cache lines; and
   selecting a random cache line of the cache lines as the victim cache line instead of performing the searching of the cache lines if, after performing each of the searching of the cache lines and the reducing of the priority state of at least one cache line K times, no cache line with the lowest priority state is found;
   wherein:
      N is an integer greater than or equal to 3; and
      K is an integer greater than or equal to 1 and less than or equal to N−2.

13. The method of claim 12, wherein K is 2.

14. The method of claim 12, further comprising, on a cache hit, increasing the priority state of the cache line associated with the cache hit.

15. The method of claim 12, wherein the victim cache line is a next victim cache line to be filled after a subsequent cache miss.

16. The method of claim 15, further comprising, after a cache hit:
   searching the cache lines for a cache line with a priority state equal to a target state one to L times, beginning with a target state of the lowest priority state and incrementing the target state for any subsequent search associated with the cache hit;
   if the cache line with the priority state equal to the target state is found, selecting that cache line as the next victim cache line; and if the cache line with the priority state equal to the target state is not found after L searches, selecting a random cache line of the cache lines as the next victim cache line;
wherein L is an integer greater than or equal to 1 and less than or equal to N−2.

17. The method of claim 12, wherein the at least one of the searching of the cache lines, the reducing of the priority state of at least one cache line, and the selecting of the random cache line of the cache lines as the victim cache line in parallel with a cache fill.

18. A system, comprising:
a cache configured to store a plurality of cache lines, each cache line associated with a priority state from among N priority states; and
a controller coupled to the cache and configured to:
on a cache miss, determine a next victim cache line of the cache in parallel with filling a current victim cache line of the cache;
on a cache hit, determine the next victim cache line of the cache; and
on a subsequent cache access, use the next victim cache line as the current victim cache line.

19. The system of claim 18, wherein the controller is further configured to:
search the cache lines for a cache line with a lowest priority state of the priority states to use as the next victim cache line;
if the cache line with the lowest priority state is not found, reduce a priority state of at least one of the cache lines; and
select a random cache line of the cache lines as the next victim cache line if, after performing each of the searching of the cache lines and the reducing of the priority state of at least one cache line K times, the cache line with the lowest priority state is not found;
wherein:
N is an integer greater than or equal to 3; and
K is an integer greater than or equal to 1 and less than or equal to N−2.

20. The system of claim 18, the controller is further configured to, after a cache hit:
search the cache lines for a cache line with a priority state equal to a target state one to L times, beginning with a target state of a lowest priority state and incrementing the target state for any subsequent search associated with the cache hit;
if the cache line with the priority state equal to the target state is found, select that cache line as the next victim cache line; and
if the cache line with the priority state equal to the target state is not found after L searches, select a random cache line of the cache lines as the next victim cache line;
wherein L is an integer greater than or equal to 1 and less than or equal to N−2.

* * * * *